3,203,766
APPARATUS FOR THE RECOVERY OF SOLIDS
FROM PRESSURE VESSELS
James F. Mudd, Buffalo, N.Y., and Edward H. Casey, Arlington, Va., assignors to Phillips Petroleum Company, a corporation of Delaware
Filed July 6, 1961, Ser. No. 130,709
5 Claims. (Cl. 23—252)

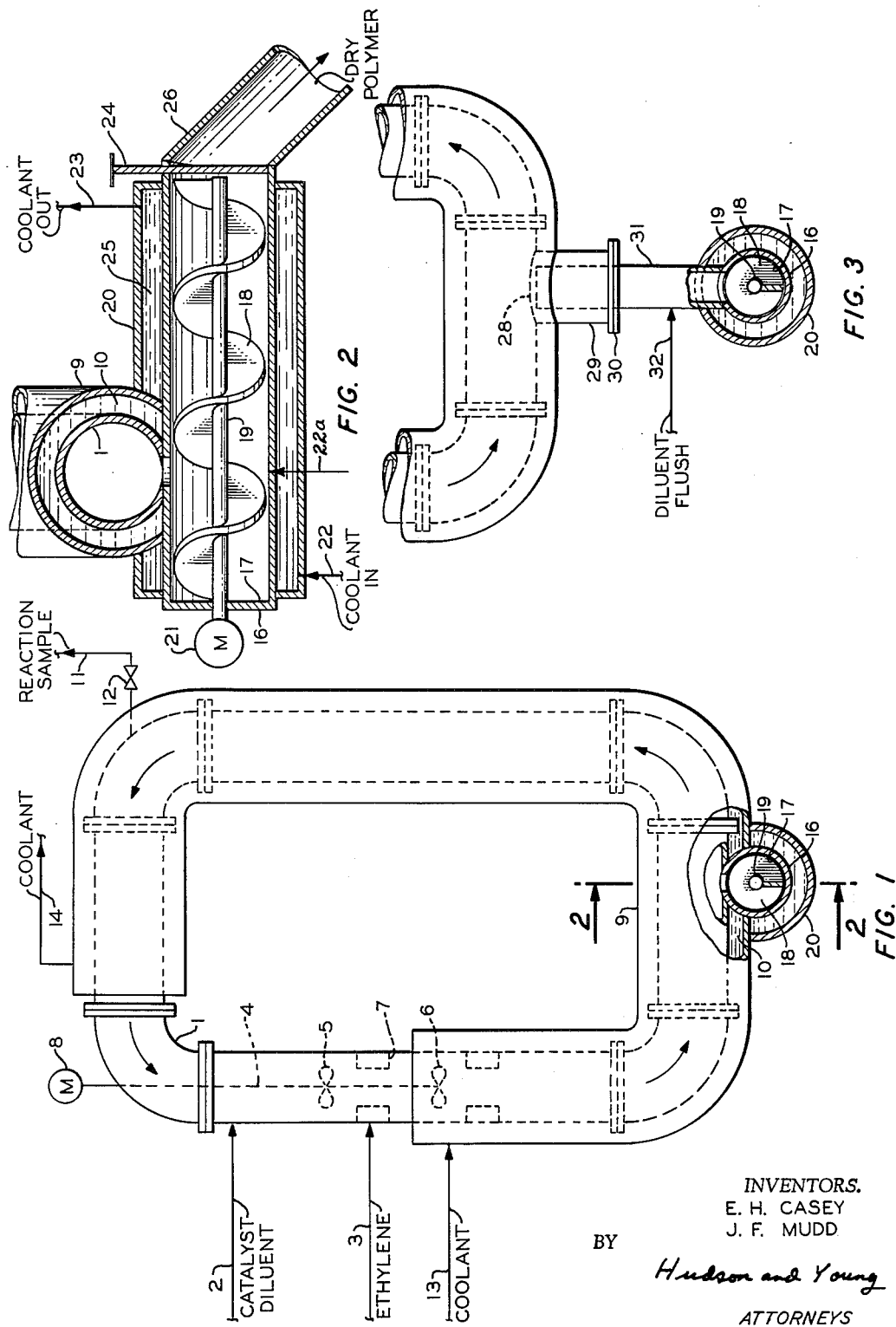

This invention relates to the recovery of solids from pressure vessels. In one aspect, this invention relates to the recovery of olefin polymers from hydrocarbon slurries thereof. In another aspect, this invention relates to improved apparatus for the recovery of solid particulate olefin polymers from continuous path loop reactors.

The removal of solids from a pressure vessel is frequently a difficult problem since this usually requires the removal of a portion of the carrying fluid as well as a decrease in pressure within the reactor. This problem is particularly aggravated when the solids to be removed comprise a reaction product and any substantial loss of pressure or diluent would upset the chemical reaction. One example of such a reaction process is the polymerization of ethylene and mixtures of ethylene with other unsaturated hydrocarbons to produce a solid particle form polymer which must then be removed from the reaction zone substantially continuously without the substantial loss of diluent or reaction zone pressure. In the prior art a method and apparatus is known for reducing the fouling of reaction surfaces by carrying out the polymerization reaction in a tubular closed loop reaction zone with smooth surfaces. The catalyst, liquid, diluent and hydrocarbon reactants are continuously moved through the reaction zone at a velocity sufficient to prevent settling and in the highly turbulent flow range thereby producing a solid particle form product which is then withdrawn from the reaction zone.

This invention represents an improvement over the aforementioned method. A major consideration in the efficient operation of a continuous path loop reactor is the removal of the product from the reactor. It is most desirable that a minimum quantity of diluent be removed to reduce the problems inherent with separating the product from the diluent and reactants as well as purification and recycling of said diluent and reactants to the reactor. In addition, when operating a continuous path loop reactor it is most desirable that the loop reactor be operated liquid-full. The removal of a substantial quantity of diluent with the product results in a substantial loss in pressure, thereby resulting in the reduction of velocity permitting polymer deposition.

It is an object of this invention to provide an improved apparatus for the removal of solids from a pressure vessel.

It is another object of this invention to provide an improved apparatus for recovering high molecular weight, solid, particulate polymers from a hydrocarbon slurry thereof.

It is still another object of this invention to provide an improved apparatus for recovering high molecular weight, solid, particulate polymers from a continuous path loop reactor operated under superatmospheric pressure conditions and containing a hydrocarbon diluent slurry thereof.

Yet another object of this invention is to provide an improved apparatus for recovering solid particulate polymers from a continuous path loop reactor from a hydrocarbon diluent slurry thereof with a minimum loss of diluent and pressure.

These and other objects of the invention will become more readily apparent from the following detailed description, discussion and claims.

The foregoing objects are broadly realized in an apparatus comprising a tubular, closed loop reaction zone, means for introducing reactants into said reactor, means for continuously moving the contents of said reactor therethrough, with the improvement comprising a worm housing in open communication with said reactor and so disposed as to receive particulate solids from said reactor, a solids conveying means within said housing for removing said solids from the area of particle removal collection, a constriction disposed in said housing downstream from said area of particle removal, said constriction impeding flow therethrough and causing particles to compact upstream therefrom thereby minimizing the loss of fluid from said reactor, and means for withdrawing product from said housing.

In one aspect of the invention the housing and solids conveying means intersect a lower portion of one of the horizontal legs of the loop reactor.

In another aspect of the invention the housing and conveying means are in open communication with the lower portion of an upright appendage on a horizontal leg of said loop reactor.

In still another aspect of the invention a diluent-coolant is directly injected into the interior of the worm-housing so as to back-flush the diluent, small particles and reactants back into the reaction zone as well as cool the product.

The invention is broadly applicable to any process or apparatus requiring the continuous discharge of particulate solids from a slurry thereof. The invention is particularly adaptable to process and apparatus operating under superatmospheric pressures and requiring a minimum loss of diluent and pressure.

Preferably the invention is applicable to the removal of solid particulate olefin polymers from a continuous path loop reactor such as described in Norwood, supra.

It is disclosed in Hogan et al., U.S. Patent 2,825,721, that polymers and copolymers can be produced by contacting one or more olefins with a catalyst comprising as an essential ingredient chromium oxide, preferably including a substantial amount of hexavalent chromium. The chromium oxide is associated with at least one other oxide particularly selected from the group consisting of silica, alumina, zirconia and thoria. The olefin feed used for the polymerization is at least one olefin selected from 1-olefins having a maximum of 8 carbon atoms per molecule and no branching nearer the double bond than the 4-position. Examples of olefins which can be polymerized by the described method include ethylene, propylene, 1-butene, 1-pentene and 1,3-butadiene. Copolymers, such as ethylene-propylene copolymers and ethylene-butadiene copolymers, can also be prepared by utilizing the chromium oxide containing catalyst. The olefins are polymerized in the presence of a hydrocarbon diluent, for example, an acyclic, alicyclic or aromatic compound which is inert.

Recently it has been discovered that there is a critical polymerization temperature range within the broad range disclosed by Hogan et al. in which it is possible to produce increased yields of high molecular weight polymers of ethylene which are insoluble in the hydrocarbon diluent. This polymer is formed in association with the polymerization catalyst and is suspended in the liquid diluent in solid particle form. The preparation of insoluble particle form polymer is known in the art. In the following discussion the term "particle form polymer" will be employed to designate the insoluble polymers of ethylene formed in accordance with the known method.

Particle form polymer can be prepared from ethylene and from mixtures of ethylene with other unsaturated hydrocarbons, for example, mixtures of ethylene with minor amounts of higher 1-olefins, such as propylene, 1-butene, 1-pentane, 1-hexene, and the like. Examples of comonomers which can be used with ethylene include 1-olefins having no branching nearer the double bond than the 4-position and conjugated and nonconjugated diolefins. The polymerization reaction is carried out in the presence of a liquid hydrocarbon diluent which is inert in the polymerization reaction and in which the majority of the polymer is insoluble under reaction conditions. Suitable diluents include paraffins such as those having from 3 to 12 and preferably 3 to 8 carbon atoms per molecule, for example, n-butane, n-pentane, isopentane, n-hexane, n-decane, etc., saturated cyclic hydrocarbons such as cyclohexane, cyclopentane and methylcyclopentane, methylcyclohexane, etc. The polymerization reaction temperautre will vary depending on the particular liquid diluent which is employed and on the olefin reactants. Usually, however, polymerization is carried out at 230° F. and below, preferably between about 225° F. and about 150° F. The olefin reactants are contacted in the polymerization zone with a suspension of subdivided chromium oxide catalyst in the liquid hydrocarbon diluent under the aforementioned temperatures and under pressures siutable to maintain the diluent in the liquid phase. Concentration of the catalyst in the reaction zone can vary widely; however, generally it will be in the range of 0.001 to 5 percent by weight based on the liquid hydrocarbon diluent.

By the apparatus of this invention the polymer product is continuously recovered from the loop reactor with a minimum of accompanying liquid diluent and hydrocarbon reactants. This minimizes the need for recycling olefin and diluent from the product recovery zone to the reaction zone thereby resulting in an improved economic climate. Another advantage of this system is that less new diluent is introduced to the reactor thereby decreasing the possibility of the introduction of catalyst poisons into the reactor system. Catalyst productivity is thereby generally improved with a consequent lower ash content in the product.

It is surprising that the utilization of the apparatus of this invention in direct communication with a loop reactor results in the concentration of polymer from the 18 to 25 percent found within the reactor to approximately 75 to 100 percent at the discharge end of the extruder or auger. These concentrations vary with the reactants and the reaction conditions within the reaction zone.

The invention is best described by reference to the accompanying drawings.

FIGURE 1 represents a diagrammatic illustration of an auger contained in a worm housing intersecting the lower portion of a horizontal leg of the loop reactor at right angles to the direction of the flow within the loop.

FIGURE 2 represents a cross section at the point of intersection of 2—2 in FIGURE 1 better illustrating the component parts of the auger, their relationship to the loop reactor and the positioning of the constriction within the worm housing.

FIGURE 3 represents another embodiment of the invention whereby an auger intersects the lower portion of a settling leg.

As shown in a preferred embodiment in FIGURE 1, reactor 1, which is oblong in shape, is made of flanged straight pipe sections and ells joined together to provide a continuous flow path which is substantially free from obstructions. The reactor is jacketed by section 9 which forms an annular space 10 with the reactor 1. By means of inlet 13 and outlet 14 a heat exchange fluid is permitted to flow through annular space 10 to control the temperature of the reactor. Conduit 2 is provided for the introduction of catalyst and diluent into the reactor and conduit 3 is provided for the introduction of ethylene into the reactor. Conduit 11 and valve 12 are provided for the periodic removal of a reaction sample to ascertain the conditions within the reactor. Thermocouples (not shown) can be provided for sensing the temperature in the reactor. Provision can be made to transmit the measurement of the reactor temperature to a temperature recorder-controller (not shown) which can be utilized to control the reactor temperature. Various reactor temperature control methods can be used including control of the heat exchange fluid to jacket 9, control of the quantity and/or temperature of reactants entering the reactor, control of the amount of catalyst entering the reactor, etc. Vertically disposed drive shaft 4 connects variable speed motor 8 to propellers 5 and 6. Although this invention is illustrated in connection with a particular loop reactor using a propelling means in a vertical leg, it is frequently desirable to insert the propelling means in a horizontal leg. Both axial flow and rotational swirl are produced by propellers 5 and 6 and a part of the rotational swirl is converted to axial flow by providing straightening vanes 7, formed by metal plates projecting perpendicularly from the inner wall of the reactor and preferably positioned in the area of propellers 5 and 6. Any suitable means may be used to convert rotational energy to fluid flow energy.

In the apparatus shown the vertical leg in which the propellers are positioned is of substantially the same cross section as the remainder of the reactor; however, if desired, the vertical leg may be of larger or smaller diameter than the remainder of the reactor. The various parts which make up the reactor are constructed to provide a smooth, continuous, inner surface presenting a minimum of obstruction to flow. The only obstructions of any consequence in the reactor are the propellers 5 and 6 and straightening vanes 7. The reactor may be made up of flanged sections or partially or completely welded.

Although this invention is described with reference to a particular type of continuous path reactor it should be understood that the invention is not thereby limited.

FIGURE 1 represents one possible relationship between the apparatus of this invention and a loop reactor. Since the velocity of the materials within the loop reactor is controlled so as to be in the turbulent flow range and to prevent the deposition of polymer particles, it is readily seen that the auger or extruder should intersect the loop reactor in such a position that a maximum quantity of solid particulate polymer will enter into the interior of the worm housing by gravity or centrifugal forces. One preferred location is a lower portion of a horizontal leg. Another preferred location is at one of the bends of the loop reactor so that centrifugal force will throw the solid particles into the housing.

As shown in FIGURE 1 it is preferred that the auger or worm not extend into the path of the diluent within the loop reactor, although it is permissible for the worm to be positioned below the liquid flow path. Worm housing 16 preferably intersects the reactor wall 1 at right angles to the flow path of materials within the reactor, although it is within the scope of the invention for the auger and worm housing to be in the same plane as the direction of flow providing the opening communicating between the interior of the worm housing and the loop reactor is sized so as to permit polymer gravitation of the large particles without disturbing the flow of materials throughout the reactor. There is a slight clearance between auger 18 and inner face 17. Auger 18 is driven by any conventional drive means 21 through a shaft 19, as shown in FIGURE 2.

FIGURE 2 better illustrates the positioning of the worm housing 16, loop reactor 1 and constriction 24. Since the olefin polymerization reaction is exothermic, the evolved heat may result in fusion of the accumulated polymer product within the auger thereby resulting in agglomeration of said product to a mass which may deposit on the auger or be difficult to remove from the apparatus. Preferably the worm housing 16 is cooled by a cooling jacket 20 with a coolant entering annular space 25 through conduit 22 and exiting through conduit 23. It is desirable to directly inject a diluent-coolant into the interior of the worm housing through conduit 22A so as to back-flush the diluent, small particles, and reactants back into the reaction zone as well as cool the contents.

The solid particulate polymer and diluent continuously gravitate from the interior of loop reactor 1 into the worm housing 16. The auger 18, moving at a constant speed, continuously moves the polymer and diluent toward the discharge end. By conventional practice this would result in the removal of an excessively large quantity of diluent and reactants since conventional augers are mere conveying devices. However, by the apparatus of this invention a constriction is provided in the discharge end of the worm housing 16 so as to effect a compaction of the polymer prior to discharge. This compaction results in the annular space between the worm housing 16 and the worm 18 being completely filled at the discharge end thereby forcing the reverse flow of the diluent into the reactor. The illustrated simplified constriction is a gate valve 24 which is periodically opened to permit the discharge of compacted, substantially diluent-free polymer solids. It is also within the scope of the invention to provide other types of restrictions such as a simple orifice designed so as to permit only the discharge of solid polymer. The solid polymer is then removed from the worm housing 16 via conduit 26 for further processing. Due to the compaction of the polymer and the removal of diluent therefrom, the polymer is substantially dry and requires a minimum of further processing for the removal of solvent and reactants.

One difficulty in the operation of loop reactors and the use of continuous removal devices arises during periods when no polymer is being produced. During such periods it is essential that the removal device not permit the loss of diluent and pressure from the loop reactor. By applicants' invention there is continuously provided a dynamic "plug" of polymer within the polymer discharge apparatus thereby preventing at all times the loss of diluent and hydraulic pressure. During start-up the restriction or valve remains closed so that no diluent escapes.

In another embodiment of the invention the auger or extruder is attached to the lower portion of a settling leg.

By the method and apparatus described in the copending application of J. S. Scoggin, Serial No. 19,007, filed March 31, 1960, an appendage is attached to the loop reactor in such a manner that the flowing reactants and diluent will continuously pass the entrance to said appendage thereby permitting the heavier particles to continuously enter the appendage by gravitational or centrifugal forces thereby resulting in the collection within the appendage of a fraction concentrated in particulate polymer solids. This appendage is frequently referred to as a receiving zone or settling leg and may be of any type so long as the entrance thereto is large enough to prevent bridging of the polymer and not so large as to result in an unduly large amount of diluents and reactants being entrapped in the receiving zone. As described therein, the polymer production rate is a function of the settling area, i.e., the diameter of the entrance to the receiving zone. The required length of the receiving zone is also a function of the velocity as well as the inventory of polymer within the receiving zone. For instance, when using a 10-inch I.D. reactor, a 1¼-inch receiving zone and a reactor velocity of approximately 8 feet per second, the turbulent zone extends approximately 5½ receiving zone diameters into said zone so the length must extend past this point to provide a zone of relative quiet. When the polymer solids concentration is 20 to 25 percent within the reactor and the linear velocity is 10 to 14 feet per second, the polymer will build up within the zone at an approximate rate of 2 feet per minute. The receiving zone may consist of a simple tube appended to the lower side of the reaction zone. Preferably the length of the zone will be at least three times the diameter of the receiving zone, more preferably four to forty times. In general, it is more advantageous to have a multiple number of small diameter receiving zones than a single large diameter unit to increase the flexibility of control over production rate. Other conventional types of receiving zones, such as liquid-solid cyclone, centriclone, centrifuge, etc. or a series of settling tanks are employable.

Preferably, secondary polymerization within the receiving zone is reduced by the use of a direct or indirect heat exchange system such as a diluent flush. A diluent flush not only cools the polymer below the softening point so as to prevent agglomeration but may serve to elutriate small polymer particles back into the reaction zone.

As shown in FIGURE 3, the apparatus of this invention is employable when attached directly to the settling leg. This combination has a particular advantage since the settling leg preconcentrates the polymer. Any conventional auger extruder is employable so long as there is provided a constriction near the discharge end that will compact the polymer and curtail the flow of diluent from the reactor. As shown in FIGURE 3, the settling leg 31 intersects the lower portion of a horizontal leg of the loop reactor at point 28 and is positioned within column 29. The receiving zone may consist of a pipe welded directly onto the reactor outside wall and extending through the heat exchange jacket thereby establishing open communication with the reactor at position 28. This section terminates in a flange 30 through which the receiving zone 31 protrudes from the reactor to some distance below the reactor thereby forming a receiving chamber or zone. To prevent the agglomeration of polymer within the receiving zone, diluent used within the reactor is continuously supplied through conduit 32 into the interior of receiving zone 31. Diluent to be introduced through conduit 32 may be obtained from an external supply if required, but since the system is usually liquid full and only a small quantity of diluent will be discharged with the polymer from the auger extruder, it is preferable that the diluent be obtained from the system itself. This is conveniently done by tapping into the reactor at a point where diluent without any solid material such as catalyst or polymer can be drawn off. In the case of the loop reactor illustrated in the drawing, a suitable point for withdrawing diluent would be at the inside corner of one of the 90 degree bends of the reactor. Because of the centrifugal forces present at the bend, the heavier solids are thrown to the outside of the bend and only the liquid diluent will be present at the inside of the bend. This diluent can be drawn off through a connection (not shown), cooled as required in a heat exchanger (also not shown) and injected into settling leg 31 via conduit 32 as previously described.

By the use of the apparatus of this invention, and by following the method described, substantially dry, solid particulate polymer is discharged from the high pressure loop reactor with a minimum loss of diluent and pressure.

While little has been said about the method of this invention, it will be clear from a reading of the foregoing specification that the method comprises essentially the steps of providing a zone of reduced turbulence into which the solid particles of polymer can fall, removing the polymer from this zone, compacting the polymer against a restriction in such a fashion as to force the liquid diluent out of the slurry and back into the reaction zone, and finally forcing the polymer through or past the restriction.

While certain examples, structures, composition and process steps have been described for purposes of illustration, the invention is not limited to these. Variation and modification within the scope of the disclosure and the claims can readily be effected by those skilled in the art.

We claim:

1. An apparatus comprising in combination a tubular closed loop reactor having two vertical and two horizontal legs, inlet means for introducing reactants into said reactor disposed on one of said vertical legs, means for continuously propelling the contents of said reactor therethrough disposed upstream and downstream from said inlet means, means for straightening the flow of said contents located downstream from said propelling means, a housing intersecting the lower portion of said reactor and in direct open communication with the interior of said reactor, said housing being located in the lower portion of the said reactor so as to receive particulate solids entering from said reactor, worm-type solids conveying means contained within said housing for laterally removing said solids from an area of particle collection, a constriction disposed in said housing downstream from said area of particle collection, said constriction impeding flow therethrough and causing said particles to compact upstream therefrom whereby diluent is washed back into said reactor and means for withdrawing product from said housing.

2. An apparatus comprising in combination a tubular closed loop reactor having two vertical and two horizontal legs, inlet means for introducing reactants into said reactor disposed on one of said vertical legs, means for continuously propelling the contents of said reactor therethrough disposed upstream and downstream from said inlet means, means for straightening the flow of said contents located downstream from said propelling means, a housing intersecting the lower portion of said reactor and in direct open communication with the interior of said reactor, said housing being located in the lower portion of the said reactor so as to receive particulate solids entering from said reactor, worm-type solids conveying means contained within said housing for laterally removing said solids from an area of particle collection, means for injecting a diluent into the interior of said housing so as to backflush small particles, diluent, and reactants back into said reactor, a constriction disposed in said housing downstream from said area of particle collection, said constriction impeding flow therethrough and causing said particles to compact upstream therefrom whereby diluent is washed back into said reactor and means for withdrawing product from said housing.

3. The apparatus of claim 2 wherein said housing intersects the bottom portion of a horizontal leg of said reactor at right angles to the longitudinal axis of said leg.

4. The apparatus of claim 2 wherein said constriction comprises valve means periodically actuated to permit the withdrawal of polymer from said housing with a minimum loss of diluent.

5. Apparatus comprising in combination a tubular closed loop reactor having two vertical legs and two horizontal legs, with smooth bends, said reactor being substantially free from internal obstructions, means for introducing olefin reactant into said reactor disposed on one of said vertical legs, means for continuously propelling the contents of said reactor therethrough disposed upstream and downstream from said inlet means, means for straightening the flow of said contents located downstream from said propelling means, receiving means attached to a lower portion of said reactor end in open communication with the interior of said reactor for continuously receiving particulate polymer solids entering from said reactor a housing intersecting the lower portion of said receiving means disposed so as to receive solid particles entering from said receiving means; a worm-type solids conveying means contained within said housing for laterally removing said solids from said receiving means; means for injecting diluent into said receiving means and means for injecting a diluent into the interior of said housing so as to back flush small particles, diluent and reactants back into said reactor; a constriction disposed in said housing downstream from said receiving means for impeding flow therethrough and causing said particles to compact upstream therefrom thereby minimizing loss of diluent from said reactant; and a means for withdrawing polymer from said housing.

References Cited by the Examiner

UNITED STATES PATENTS

| | | | |
|---|---|---|---|
| 2,321,015 | 6/43 | Davis | 23—288.3 X |
| 2,376,833 | 5/45 | Teter | 208—153 |
| 2,894,824 | 7/59 | Lanning | 23—285 |

MORRIS O. WOLK, *Primary Examiner.*

JAMES H. TAYMAN, JR., *Examiner.*